(12) United States Patent
Mueller

(10) Patent No.: US 7,337,868 B2
(45) Date of Patent: Mar. 4, 2008

(54) FRONT STRUCTURE OF A MOTOR VEHICLE

(75) Inventor: Carl-Friedrich Mueller, Weissach (DE)

(73) Assignee: DaimlerChrysler AG, Stuttgart (DE)

( * ) Notice: Subject to any disclaimer, the term of this patent is extended or adjusted under 35 U.S.C. 154(b) by 109 days.

(21) Appl. No.: 11/221,932

(22) Filed: Sep. 9, 2005

(65) Prior Publication Data

US 2006/0201150 A1    Sep. 14, 2006

(30) Foreign Application Priority Data

Mar. 7, 2005    (DE) .................... 10 2005 010 809

(51) Int. Cl.
*B60K 28/10* (2006.01)
(52) U.S. Cl. .................................... 180/274
(58) Field of Classification Search ............... 180/274, 180/275, 276; 74/512, 513, 514, 560
See application file for complete search history.

(56) References Cited

U.S. PATENT DOCUMENTS

| | | | | |
|---|---|---|---|---|
| 4,369,559 A | * | 1/1983 | Phillips | ................. 29/401.1 |
| 5,848,558 A | * | 12/1998 | Isono et al. | .................. 74/512 |
| 6,112,616 A | * | 9/2000 | Schonlau et al. | ............. 74/512 |
| 6,269,900 B1 | * | 8/2001 | Adams et al. | ............... 180/274 |

FOREIGN PATENT DOCUMENTS

| | | |
|---|---|---|
| DE | 2841988 | 4/1980 |
| DE | 3018732 C2 | 5/1982 |
| DE | 19515852 C2 | 11/2001 |
| DE | 601 02 493 T2 | 12/2004 |

* cited by examiner

Primary Examiner—Paul N. Dickson
Assistant Examiner—Robert A. Coker
(74) Attorney, Agent, or Firm—Crowell & Moring LLP

(57) ABSTRACT

The front structure of a motor vehicle has a brake device with a brake cylinder extending substantially in the direction of travel of the vehicle. To reduce the risk of injury for a vehicle driver in the event of a crash in the case of a front structure in which a wiping water container is arranged ahead of the brake cylinder with regard to the direction of travel, the wiping water container has a wall section on a rear wall which faces the brake cylinder. The wall section is configured in such a way that, in the event of a crash, the rear wall can be penetrated in this wall section by an end of the brake cylinder which faces the wiping water container.

13 Claims, 3 Drawing Sheets

FRONT STRUCTURE OF A MOTOR VEHICLE

This application claims the priority of German application 10 2005 010 809.1, filed Mar. 7, 2005, the disclosure of which is expressly incorporated by reference herein.

BACKGROUND AND SUMMARY OF THE INVENTION

The present invention relates to a front structure of a motor vehicle having a brake cylinder extending substantially in a direction of travel of the vehicle.

A front structure of this type, known, for example, from German documents DE 195 15 852 C2, DE 28 41 988 C2 and DE 30 18 732 C2, comprises a brake device which has a brake cylinder which extends substantially in the direction of travel of the vehicle.

It is customary to equip a motor vehicle with a wiping water container which stores water which is provided for washing a windshield and, optionally, a rear window and headlight panes. In some vehicles, in particular passenger cars, this wiping water container can likewise be arranged in the front structure of the vehicle ahead of the brake cylinder with regard to the direction of travel.

In the event of a crash, in particular in a frontal crash, a relative displacement between the wiping water container and the brake device can occur, which can lead to a collision of the wiping water container with the brake cylinder. In particular if the wiping water container is filled, a collision of this type can drive the brake cylinder counter to the direction of travel, which can lead to an intrusion of a brake pedal via the coupling of the brake cylinder to the brake pedal. That is to say, the brake pedal can move toward the driver as a result of an unfavorable crash, which can lead to considerable injuries. Furthermore, the brake cylinder can collide with the wiping water container, as a result of which the functioning of a brake system of the vehicle is impaired.

The present invention is concerned with providing an improved front structure of the type mentioned which reduces the disadvantageous effects of a collision between the brake cylinder and the wiping water container.

According to the invention, this problem is solved by way of a structure having a wiping water container arranged ahead of a brake cylinder with regard to the direction of travel, in which the wiping water container has a wall section on a rear wall which faces the brake cylinder, and in which the wall section is configured in such a way that, in the event of a crash, the rear wall can be penetrated at this wall section by an end of the brake cylinder which faces the wiping water container. Advantageous embodiments are the subject matter of dependent claims.

The wiping water container of the invention is configured in such a way that, in the event of a crash, it is possible for the brake cylinder to enter the wiping water container. A collision between the wiping water container and the brake cylinder which may occur in the event of a crash thus does not lead primarily to the brake cylinder being displaced, but to the brake cylinder entering the wiping water container. As a result, the wiping water container can move relative to the brake cylinder, without causing a displacement movement of the brake cylinder, which reduces the risk of brake pedal intrusion. The safety for the driver in the event of a crash is thus increased.

Entry of the brake cylinder into the wiping water container in the event of a crash is made possible by the fact that the wiping water container has a wall section on a rear wall which faces the brake cylinder, which wall section is configured for penetration by the brake cylinder. The wiping water container thus has in this wall section a special adaptation which makes it possible or easier for the brake cylinder to enter the wiping water container. Here, the adaptation is carried out in such a way that the rear wall can be penetrated by the brake cylinder in the wall section without the brake cylinder being displaced relative to the vehicle in the process. The wiping water container is thus designed in this wall section in such a way that a penetration force which has to be applied by the brake cylinder to the wall section, in order to penetrate the rear wall, is smaller than a retaining force with which the brake cylinder or the brake device is fastened to the vehicle. In this way, the wall section yields in the event of a crash before the brake cylinder is displaced relative to the vehicle.

A further particular advantage, according to the invention, of the front structure or the wiping water container is that the invention can be retrofitted, that is to say the wiping water container according to the invention can be inserted into a conventional front structure instead of a conventional wiping water container, in order to realize the front structure according to the invention.

In one preferred embodiment, the wall section can have a reduced wall thickness compared with the remaining rear wall, as a result of which, in the event of a collision, the brake cylinder can penetrate the wall section particularly simply.

In another embodiment, an edge region which encloses the wall section at least partially can be configured as a predetermined break point, as a result of which the wall section is detached from the rear wall along the edge region by the collision with the brake cylinder, as a result of which an opening is produced in the rear wall, through which opening the brake cylinder can enter the wiping water container.

Here, it is entirely possible to shape the wall section with the reduced wall thickness and/or with the edge region which is configured as a predetermined break point integrally on the rear wall or on the wiping water container, as a result of which the manufacture of the wiping water container is inexpensive.

Further important features and advantages of the invention are apparent from the dependent claims, from the drawings, and from the associated description of the drawings.

Features which are mentioned above and which are still to be explained in the following text can be used not only in the respectively specified combinations, but also in other combinations or alone, without departing from the scope of the present invention.

Preferred exemplary embodiments of the invention are shown in the drawings and will be described in greater detail in the following description. Identical designations relate to identical, similar or functionally identical components.

DETAILED DESCRIPTION OF THE INVENTION

Figure 1:
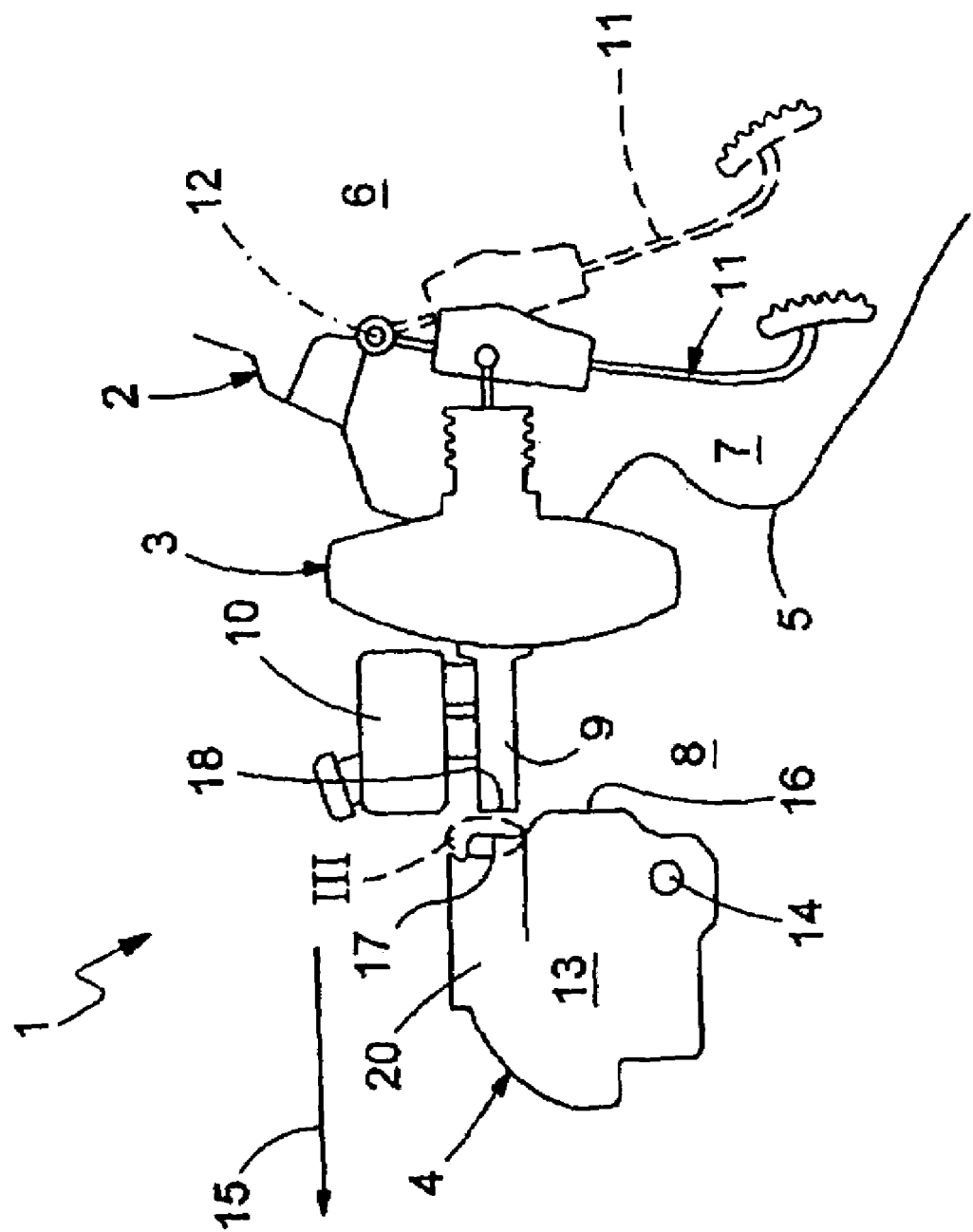
FIG. 1 shows a very simplified outline illustration of a front structure according to the invention, in longitudinal section.

In accordance with FIG. 1, a front region or front structure 1 of a motor vehicle 2, in particular a passenger car, which is shown only partially comprises at least one brake device 3 and one wiping water container 4. The front structure 1 is divided from a vehicle interior 6 or a footwell 7 of the vehicle 2 in a customary manner by a bulkhead 5. The front structure 1 is thus situated in a front space 8 of the vehicle, which front space 8 usually, but not necessarily, serves as the engine bay.

The brake device 3 is a constituent part of a brake system (not shown otherwise) of the vehicle 2 and comprises a brake cylinder 9 and a brake fluid reservoir 10. The brake device 3 is coupled to a brake pedal 11 which is arranged in the footwell 7. For this purpose, the brake device 3 is expediently attached to the front wall 5 and penetrates the latter. The brake pedal 11 is mounted on the vehicle 2 at 12 in a pivotably displaceable manner and, when actuated, interacts with the brake device 3 or with the brake cylinder 9. Here, the brake pedal 11 is shown with solid lines in an actuated state and with dashed lines in an unactuated state.

The wiping water container 4 is configured in its interior 13 to store wiping water and is connected to a washing system of the vehicle 2 in a suitable manner which is not shown in greater detail. For example, a windshield of the vehicle 2 can be cleaned with the wiping water. It is likewise possible to clean headlight panes and a rear window with the wiping water. The wiping water container 4 is fastened on the vehicle 2, for example, at 14. Here, the wiping water container 4 is arranged in the front structure 1 in such a way that the wiping water container 4 is situated ahead of the brake cylinder 9 with regard to a direction of travel 15 which is symbolized by an arrow. That is to say, there is a congruence of the wiping water container 4 and the brake device 3 or the brake cylinder 9 in the direction of travel 15. In certain vehicles 2, this arrangement in the front structure 1 can prove advantageous for packaging reasons, in order for it to be possible to utilize the limited installation space which is available as effectively as possible.

The wiping water container 4 has a rear wall 16 which faces the brake cylinder 9. For its part, the rear wall 16 has a wall section 17 which is arranged so as to lie opposite an end 18 of the brake cylinder 9 which faces the rear wall 16 with regard to the direction of travel 15. The wall section 17 and the end 18 of the brake cylinder are preferably arranged so as to be aligned with one another with regard to the direction of travel 15. Here, the brake cylinder 9 is arranged in the front structure 1 in such a way that its longitudinal center axis extends substantially parallel to the direction of travel 15 of the vehicle 2.

Figure 2:
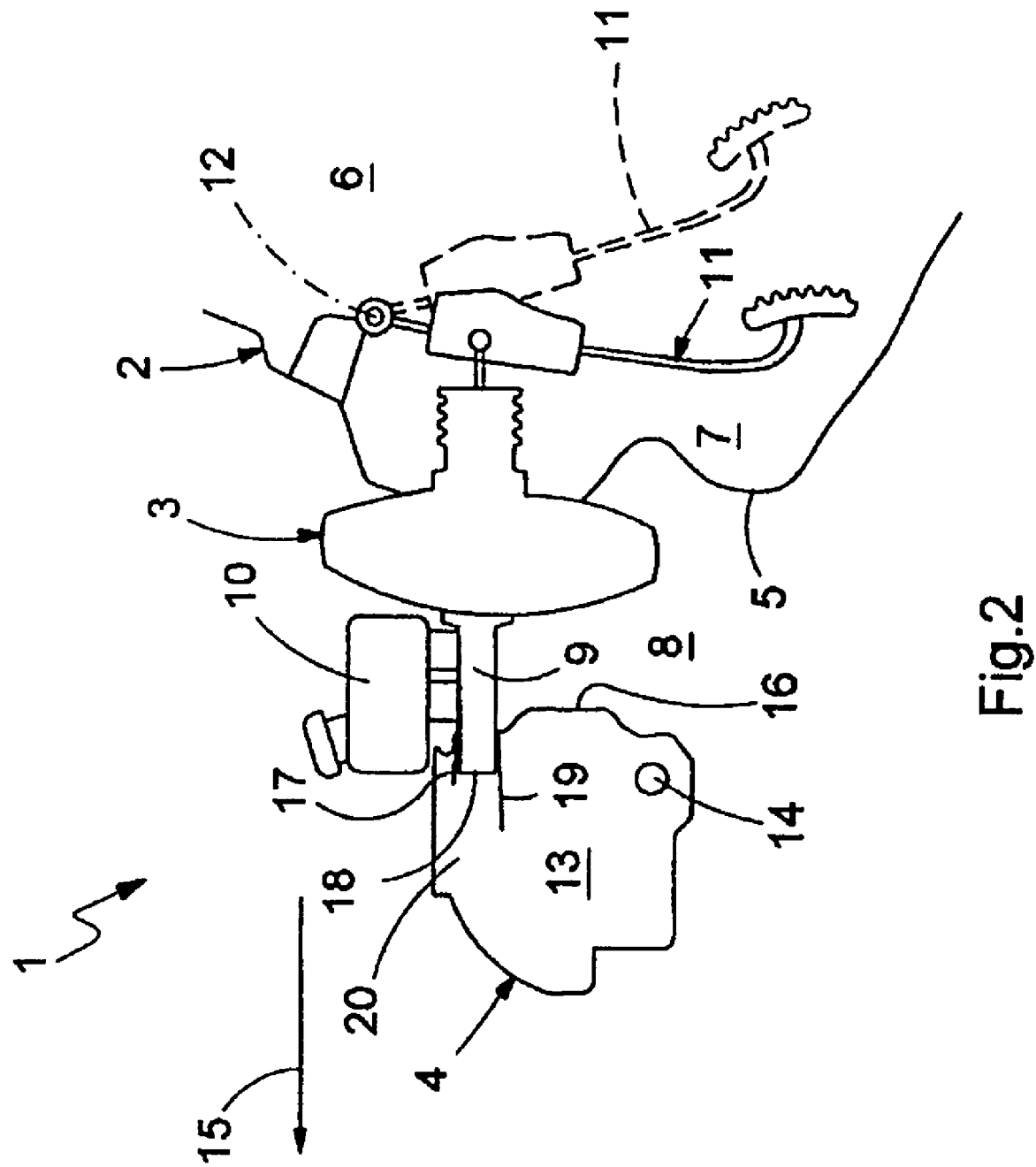
FIG. 2 is a view similar to FIG. 1, but in the event of a collision.

According to the invention, this wall section 17 is configured in such a way that, in the event of a crash, in particular in a frontal crash, the brake cylinder 9 or the end 18 of the brake cylinder can penetrate the rear wall 16 in the wall section 17. A crash of this type is shown in FIG. 2. In the event of a crash, the wiping water container 4 can move relative to the brake cylinder 9 on account of a crash-related deformation of the front structure 1 counter to the direction of travel 15. Here, a collision of the end 18 of the brake cylinder with the wall section 17 can occur. According to FIG. 2, as a result of the configuration according to the invention of the wall section 17, the end 18 of the brake cylinder can then penetrate the rear wall 16 in the region of the wall section 17, as a result of which the brake cylinder 9 can enter the interior 13. As a result, a further relative displacement of the wiping water container 4 counter to the direction of travel 15 is made easier, without excessively high forces being transmitted here between the wiping water container 4 and the brake cylinder 5. In particular, at least at the beginning of the crash, the transmission of forces of this type to the brake cylinder 9 can be avoided, which forces are so great that they move the brake cylinder 9 or the brake device 3 relative to the vehicle 2 counter to the direction of travel 15. A relative displacement of this type of the brake cylinder 9 or the brake device 3 would lead to undesirable intrusion of the brake pedal 11. In a brake pedal intrusion, the brake pedal 11 would pivot about its pivot axis 12 counter to its actuation direction and thus move toward the vehicle driver. As the vehicle driver is usually depressing the brake pedal 11 in the event of a crash, brake pedal intrusion regularly leads to pronounced force peaks or jolts which are associated with an extremely increased risk of injury for the foot and/or ankle of the driver. In the front structure 1 according to the invention, as the brake cylinder 9 can enter the wiping water container 4, brake pedal intrusion of this type is precluded, or can at least be reduced, in certain crash configurations. The front structure 1 according to the invention and the wiping water container 4 according to the invention thus reduce the risk of injuries in the event of a crash.

In the preferred embodiment which is shown here, the wiping water container 4 contains, in its interior 13, at least one guide element 19 which is configured here in the manner of a web which extends below the wall section 17 parallel to the direction of travel 15. In the event of a crash, the guide element 19 interacts with the brake cylinder 9 if the latter enters the interior 13 after the penetration of the rear wall 16. Here, the guide element 19 brings about longitudinal guidance in the direction of travel 15 between the brake cylinder 9 and the wiping water container 4. This has the consequence that, in the event of a crash, a defined relative displacement between the wiping water container 4 and the brake cylinder 9 is set, which reduces the risk of undesirable loading of the brake cylinder 9 with force. The embodiment of the guide element 19 here is purely by way of example and without restriction to the general nature of the invention. It is likewise possible for a plurality of guide elements 19 to be provided, in order to realize the desired longitudinal guidance between the wiping water container 4 and the brake cylinder 9.

With regard to entry of the brake cylinder 9 into the interior 13, which is desirable in the event of a crash, the wiping water container 4 is moreover equipped according to the invention with a cavity 20 in its interior 13. The cavity 20 is situated ahead of the wall section 17 with regard to the direction of travel 15 and is dimensioned here in such a way that, in the event of a crash, the brake cylinder 9 can enter the cavity 20 or the interior 13 unimpeded when the brake cylinder 9 has penetrated the rear wall 16. Here, in particular, the cavity 20 is adapted to the length of the brake cylinder 9.

The wall section 17 can be configured in a wide variety of ways, such that it makes it possible for the end 18 of the brake cylinder to penetrate the rear wall 16 in the event of a crash.

Figure 3:
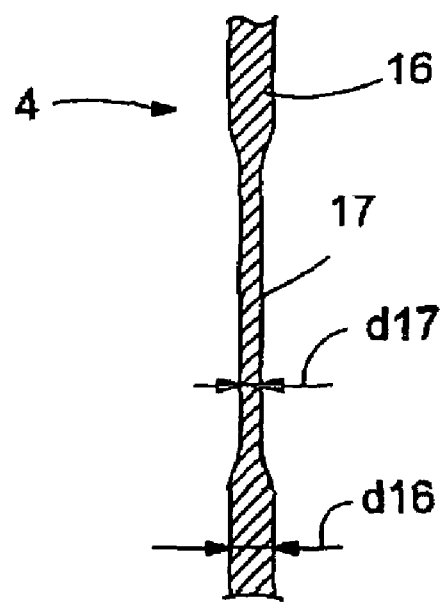
FIG. 3 is an enlarged illustration of a detail III in FIG. 1.

In a first embodiment, for example, there can be provision according to FIG. 3 for the wall section 17 to be provided with a wall thickness d17 which is smaller than a wall thickness d16 of the remaining rear wall 16. The wall section 17 can be penetrated particularly simply by the end 18 of the brake cylinder as a result of the reduced wall thickness d17. The wall thickness d17 of the wall section 17 may be at most 50%, at most 30%, or at most 10% of the wall thickness d16 of the rear wall 16, for example.

Figure 4:
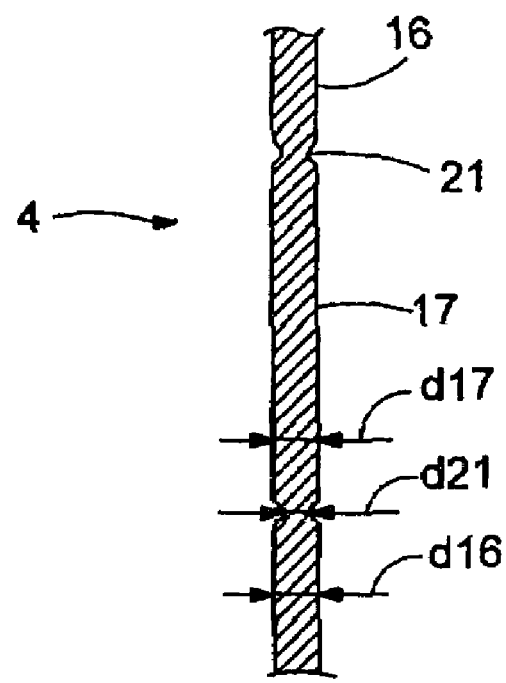
FIG. 4 is a view similar to FIG. 3, but of another embodiment.

According to FIG. 4, the penetrability of the rear wall 16 in the wall section 17 can be realized in a second embodiment by virtue of the fact that an edge region 21 which encloses the wall section 17 at least partially, and possibly completely, is configured as a predetermined break point. As a result, the wall section 17 breaks out along the edge region 21 when it collides with the end 18 of the brake cylinder. In order to configure it as a predetermined break point, this edge region 21 can have a wall thickness d21 which is smaller than the wall thickness d16 of the rear wall 16. Moreover, this wall thickness d21 of the edge region 21 can be smaller than the wall thickness d17 of the wall section 17 which is selected in the exemplary embodiment according to FIG. 4 to be as large as the wall thickness d16 of the rear wall 16. It is also true here that the wall thickness d21 of the edge region 21, for example, may be at most 50%, at most 30%, or at most 10% of the wall thickness d16 of the rear wall 16 and/or the wall thickness d17 of the wall section 17.

In the preferred embodiments which are shown here, the wall section 17 is an integral constituent part of the rear wall 16 or the entire wiping water container 4. The wiping water container 4 or its rear wall 16 can thus be manufactured in an integrated manner with the wall section 17, for example can be injection molded in one piece.

In addition to these container-side refinements of the wall section 17 which make it easier or possible for the end 18 of the brake cylinder to penetrate the rear wall 16 in the region of the wall section 17, brake cylinder-side measures are also feasible in principle which make it easier for the end 18 of the brake cylinder to penetrate the rear wall 16 in the wall section 17. For example, the edge of the end 18 of the brake cylinder can be configured as a cutting edge. In addition or as an alternative, the end 18 of the brake cylinder can be chamfered or sharpened, with the result that the end 18 of the brake cylinder, in the event of a collision, does not collide with the wall section 17 over its full surface area, but rather in a linear fashion or, in a very favorable case, in punctiform fashion.

The shape of the wall section 17 is expediently adapted to the cross section of the brake cylinder 9. For example, if the cross section of the brake cylinder 9 is circular, the wall section 17 is likewise of circular shape.

A conventional front structure 1 can also be readily rebuilt or retrofitted to form the front structure 1 according to the invention with the aid of the wiping water container 4 by merely replacing a conventional wiping water container with the wiping water container 4 according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A front structure of a motor vehicle, comprising:
    a brake device which has a brake cylinder extending substantially in a direction of travel of the vehicle, and
    a wiping water container arranged ahead of the brake cylinder with regard to the direction of travel,
    wherein the wiping water container has a wall section on a rear wall which faces the brake cylinder,
    wherein the wall section is configured in such a way that, in the event of a crash, the rear wall can be penetrated in said wall section by an end of the brake cylinder which faces the wiping water container, and
    wherein the wall section has a reduced wall thickness compared with remaining sections on the rear wall.

2. The front structure as claimed in claim 1, wherein an edge region which encloses the wall section at least partially is configured as a predetermined break point.

3. The front structure as claimed in claim 2, wherein the edge region has a reduced wall thickness compared with the wall section, compared with the remaining sections on the rear wall, or compared with both the wall section and the remaining sections on the rear wall.

4. A front structure of a motor vehicle, comprising:
    a brake device which has a brake cylinder extending substantially in a direction of travel of the vehicle, and
    a wiping water container arranged ahead of the brake cylinder with regard to the direction of travel,
    wherein the wiping water container has a wall section on a rear wall which faces the brake cylinder,
    wherein the wall section is configured in such a way that, in the event of a crash, the rear wall can be penetrated in said wall section by an end of the brake cylinder which faces the wiping water container, and
    wherein the wiping water container contains at least one guide element which, in the event of a crash, interacts with the brake cylinder to form a longitudinal guide in the direction of travel between the wiping water container and the brake cylinder if the brake cylinder enters the wiping water container after penetration of the rear wall.

5. The front structure as claimed in claim 1, wherein the wall section is shaped integrally on the rear wall.

6. The front structure as claimed in claim 1, wherein the wall section is shaped integrally on the wiping water container.

7. The front structure as claimed in claim 1, wherein, ahead of the wall section with regard to the direction of travel, the wiping water container contains a cavity which the brake cylinder can enter unimpeded in the event of a crash after penetration of the rear wall.

8. The front structure as claimed in claim 1, wherein the wiping water container contains at least one guide element which, in the event of a crash, interacts with the brake cylinder to form a longitudinal guide in the direction of travel between the wiping water container and the brake cylinder if the brake cylinder enters the wiping water container after penetration of the rear wall.

9. The front structure as claimed in claim 2, wherein, ahead of the wall section with regard to the direction of travel, the wiping water container contains a cavity which the brake cylinder can enter unimpeded in the event of a crash after penetration of the rear wall.

10. A wiping water container for a front structure of a motor vehicle, comprising a rear wall of the wiping water container which faces a brake cylinder of a brake device in an installed state and which has a wall section configured in such a way that, in the event of a crash, the rear wall can be penetrated, in said wall section, by an end of the brake cylinder which faces the wiping water container, wherein the wall section has a reduced wall thickness compared with remaining sections on the rear wall.

11. The wiping water container as claimed in claim 10, wherein an edge region which encloses the wall section at least partially is configured as a predetermined break point.

12. The wiping water container as claimed in claim 11, wherein the edge region has a reduced wall thickness compared with the wall section, compared with the remaining sections on the rear wall, or compared with both the wall section and the remaining sections on the rear wall.

13. A wiping water container for a front structure of a motor vehicle, comprising a rear wall of the wiping water container which faces a brake cylinder of a brake device in an installed state and which has a wall section configured in such a way that, in the event of a crash, the rear wall can be penetrated, in said wall section, by an end of the brake cylinder which faces the wiping water container, wherein the wiping water container contains at least one guide element which, in the event of a crash, interacts with the brake cylinder to form a longitudinal guide in the direction of travel between the wiping water container and the brake cylinder if the brake cylinder enters the wiping water container after penetration of the rear wall.

* * * * *